April 3, 1962

C. W. MEANS ETAL
PROCESS FOR THE CONTINUOUS PROPAGATION OF
FILAMENTOUS MICROORGANISMS 3,028,314

Filed Aug. 31, 1960

INVENTORS.
C. W. MEANS
G. M. SAVAGE
BY Eugene O. Retter
ATTORNEY

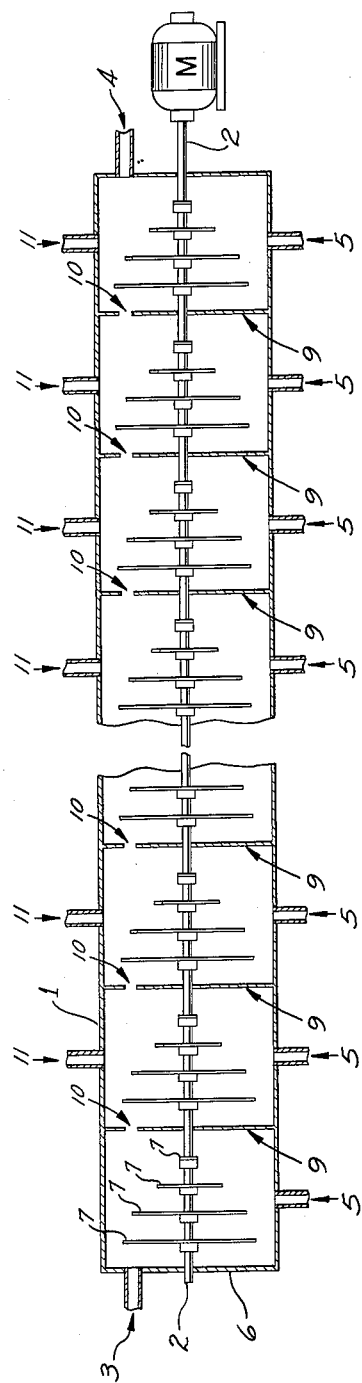

United States Patent Office 3,028,314
Patented Apr. 3, 1962

3,028,314
PROCESS FOR THE CONTINUOUS PROPAGATION OF FILAMENTOUS MICROORGANISMS
Charles W. Means, Kalamazoo, and George M. Savage, Portage Township, Kalamazoo County, Mich., assignors to The Upjohn Company, Kalamazoo, Mich., a corporation of Delaware
Filed Aug. 31, 1960, Ser. No. 53,189
13 Claims. (Cl. 195—141)

This invention relates to a process for the continuous propagation of filamentous microorganisms and for continuous fermentation by these microorganisms.

Considerable attention has been directed, particularly in the past decade, to methods of achieving continuous fermentation. Such methods have important applications not only in the production of yeast and the associated brewing industries but, more recently, in the production of antibiotics by fermentation.

The advantages of carrying out a fermentation process on a continuous basis rather than in a batch process are well-recognized in the art. Thus in a batch process considerable time is lost in cleaning and sterilizing equipment between batches. Further, in many cases, there is a time lag between the initial propagation of a microorganism and the point at which the productive cycle in the life of the microorganism is reached, which reduces the overall production potential of the batch process. Such time losses are considerably reduced in a continuous process and, using apparatus of the same capacity, it is possible in a given time to achieve a much greater throughput with a continuous process as opposed to a batch type process. The characteristics of batch broths vary as to filtration characteristics, emulsion tendencies, and the like while a continuous process yields a product with consistent characteristics.

In addition it is found that the risk of loss by contamination of the fermentation liquor is greatly reduced in the continuous process. Much less supervision, hence much less manpower, is required in the case of continuous process. The processing of the fermentation liquor can also be carried out on a continuous basis rather than a batch type of operation, thus effecting further economies in the use of equipment and manpower.

However, the methods hitherto described for the so-called continuous fermentation of microorganisms do not, in many cases, enable such processes to be maintained for more than a limited period of time. Thus it is found in many cases that, under the conditions of continuous fermentation, the useful activity (e.g., the biosynthetic activity such as the ability to produce an antibiotic) gradually deteriorates. This is particularly true in the propagation of filamentous-growth type microorganisms. This type of microorganisms is discussed in greater detail below and is generally characterized by the growth of long, interwoven threads which type of growth makes the resulting fermentation liquor difficult to agitate and aerate.

A number of reasons have been advanced to account for the falling off of useful activity in continuous fermentation processes. Such reasons include (a) biological changes in the fermentation such as changes in the strain specific characteristics of the microbial population in the fermentor caused by factors such as genetic segregation and/or the production of mutants having different characteristics, and (b) accumulation of toxic or inhibiting components in the fermentation liquor during continuous operation. Thus, when a fermentation liquor having a heavy mycelial growth, such as is generally found in the propagation of filamentous microorganisms, is subjected to agitation, for example, using a paddle stirrer, in a conventional fermentation tank, mycelium is constantly deposited on the exposed surfaces of the fermentation tank in the free space above the liquor. The deposit accumulates until it reaches sufficient bulk to fall back in caked form into the fermentation liquor. The formation of such deposits, as well as causing serious blockages of feed lines etc., means that the conditions of fermentation are not uniform and the growth characteristics of the microorganism within the deposit are different from those within the bulk of the fermentation liquor. In particular there is a tendency for sporulation to occur when deposition takes place and this leads to loss of useful biosynthetic activity within the fermentation vessel and may in some fermentations lead to a more rapid deterioration of the productivity of the microorganism.

The present invention relates to a method of conducting continuous propagation of filamentous microorganisms by means of which the difficulties of aeration and agitation are reduced to a minimum and the period of time during which the continuous fermentation can be maintained in the desired productive stage is extended considerably.

Thus the present invention, in its broadest aspect, consists in a process for the continuous propagation of filamentous microorganisms which comprises propagating said microorganisms under aerobic conditions in an elongated cylinder mounted with its longitudinal axis substantially in a horizontal plane, agitating the fermentation liquor by subjecting same to a shearing force as defined hereinafter at a plurality of positions in the cylinder, said shearing force being applied in a plane substantially perpendicular to the longitudinal axis of said cylinder, continuously introducing nutrient medium at one end of said cylinder and allowing fermentation liquor to flow from the opposite end of said cylinder so that the total volume of liquid in said cylinder remains constant, the rate of addition of nutrient medium being adjusted so that the rate of multiplication of the microorganisms is maintained in a steady state.

The term "filamentous microorganisms" means those microorganisms which produce a growth characterized by long, interwoven threads. Such microorganisms are well-recognized in the art. The actinomycetes and fungi are exemplary and include:

(a) The Streptomyces which are important because, as described in U.S. Patent 2,649,401, for example, they are productive of oxidative enzyme systems useful in the oxidation of steroids, and as described in Waksman et al., Actinomycetes and their Antibiotics, 1953 (Williams and Wilkins, Baltimore), for example, they are productive of antibiotics such as actinomycetin, actinomycin, erythromycin, streptomycin, cycloheximide, tetracycline, oxytetracycline, chlorotetracycline, novobiocin, neomycin, and chloroamphenicol;

(b) The Penicillia which are important as producers of oxidative enzymes as described, for example, in U.S. Patent 2,762,747, and as producers of antibiotics notably Penicillin by such species as *Penicillium notatum*, *Penicillium chrysogenum*, and the like;

(c) The Aspergilli which are important as producers of oxidative enzymes as described in U.S. Patent 2,649,-402 and of metabolic products such as citric acid; and the (d) Mucorales including the genera Rhizopus, Cunninghamella and Mucor of the families Mucoraceae and Choanephoraceae of the above order which are important as producers of oxidative enzyme systems and of metabolic products as described in U.S. Patent 2,602,769.

In the accompanying drawings:

FIGURE 4 shows a cross-sectional view taken in a plane vertical to the longitudinal axis of a multi-compartment fermentor in which the process of the invention can be carried out.

Figure 1:
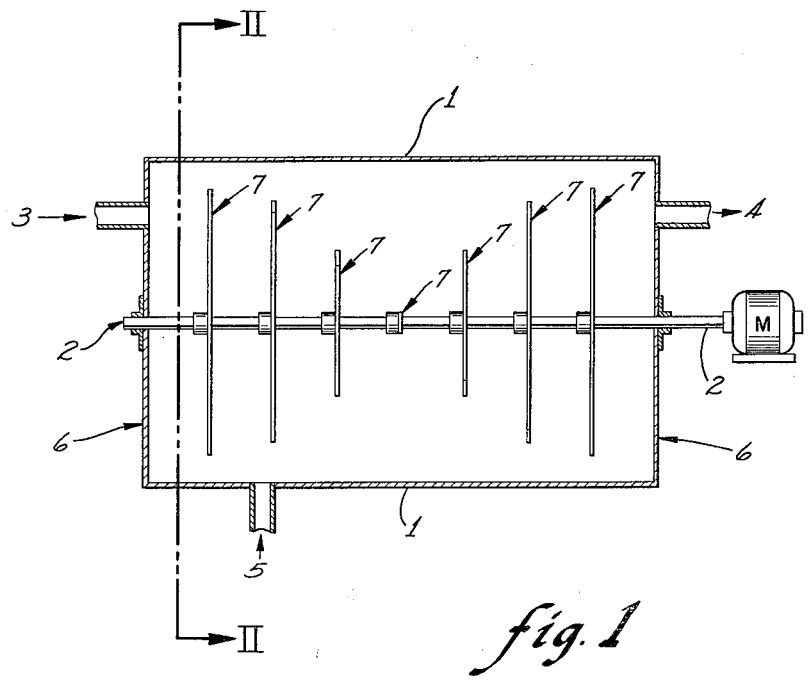
FIGURE 1 shows a cross-sectional view taken in a plane vertical to the longitudinal axis of a single-compartment fermentor in which the process of the invention can be carried out.
Figure 2:
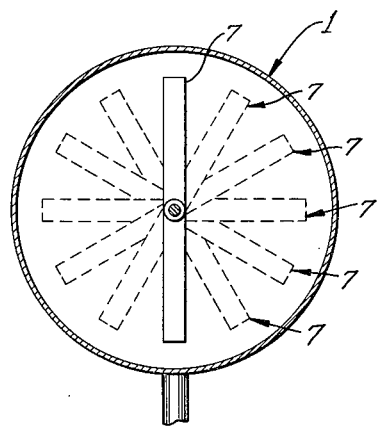
FIGURE 2 shows a cross-sectional view of the same fermentor taken along the line II—II of FIGURE 1.

The process of the invention is carried out in apparatus such as that shown schematically in the accompanying drawings. In FIGURE 1 there is shown an apparatus which comprises a cylinder 1 having a circular cross-section and mounted with its longitudinal axis substantially in a horizontal plane, the axial length of said cylinder 1 advantageously being greater than the diameter thereof. The cylinder 1 is provided with end plates 6, each of said end plates 6 being adapted to support an axle 2 which is disposed along the central axis of the cylinder 1. At intervals along the axle 2 and at right angles thereto there is mounted a plurality of blades 7, each blade being off-set radially with respect to its neighbours as shown in FIGURE 2. Said blades are preferably constructed of stainless steel having a thickness of from about 2 mm. to about 1 cm. It is to be understood that the number of blades 7 can be increased or decreased as desired and is in no way limited to the seven shown for purposes of illustration in FIGURE 1. These blades can be rotated at varying speeds and when rotated provide the aforementioned shearing force at a plurality of positions in the fermentor tube. The axle 2 is coupled at one end to a motor M. The cylinder 1 is provided with an inlet 3 for introduction of nutrient medium in the upper half of one of the end plates 6, an outlet 4 for withdrawal of fermentation liquor in the upper half of the other of the end plates 6, and one or more inlets 5 for sterile air disposed along the lower wall of the cylinder 1, each of the inlets 3, 4, and 5 being provided with valves, metering devices, etc. (not shown). The air which is to be introduced through the inlets 5 is sterilized using conventional procedures such as steam treatment and passage through filters, etc.

In carrying out the process of the invention using the apparatus illustrated in FIGURE 1 nutrient medium is placed in the cylinder 1. The volume of liquid employed in the fermentor relative to the total volume of the cylinder 1 can be varied within wide limits but we prefer to employ a volume of liquid which is of the order of three-quarters of the total volume of the cylinder 1. The nutrient medium is agitated by rotation of the axle 2, aerated by introduction of air through the inlet 5, and inoculated with a culture of the microorganisms to be propagated. When the growth of the microorganism reaches the desired stage, for example, in the case of an antibiotic-producing microorganism, when the stage of growth is reached at which production of the antibiotic will occur at a satisfactory rate, fresh nutrient medium is fed into the cylinder 1 through inlet 3 on a continuous or semicontinuous basis and fermentation liquor is allowed to flow from outlet 4 at a corresponding rate so that the total volume of liquor in the cylinder 1 remains substantially constant. The rate of addition of fresh nutrient medium is adjusted so that the rate of propagation of the microorganism is maintained in a substantially steady state.

Figure 5:
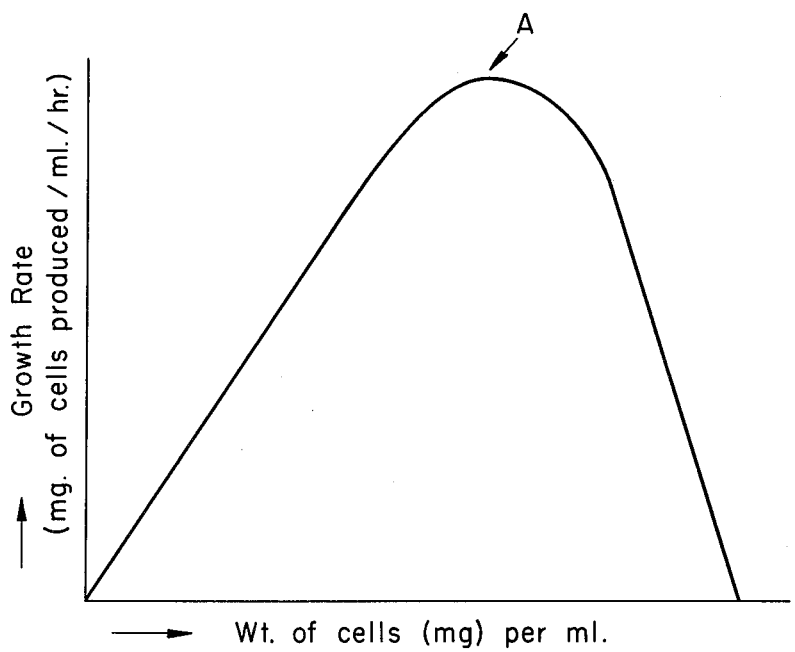
FIGURE 5 represents a typical growth curve of a microorganism.

The most desirable rate of growth to be maintained in propagating a particular microorganism according to the process of the invention is a factor which is characteristic of the organism and which must be determined by a study of the growth pattern of the organism. Thus the typical growth characteristics of a particular organism can be determined by growing the organism in a small-scale batch fermentation and measuring the rate of growth as determined by, for example, the weight of cells per unit volume, at given intervals of time. A typical growth rate curve is shown in FIGURE 5. A growth rate represented by a point such as A is generally found to be the most suitable rate of growth to be maintained in the steady state of a continuous fermentation as carried out according to the process of the invention. The rate of dilution, i.e., rate of addition of nutrient medium, necessary to maintain this particular rate of growth can readily be determined from the growth rate curve by methods known in the art, for example, using the method described by Luedeking and Piret, Journal of Biochemical and Microbiological Technology and Engineering, 1,431, 1959.

A full discussion and mathematical treatment of the factors influencing the rate of growth in continuous fermentation is given by Maxon, Applied Microbiology, 3, 110–122 (1955).

We have found that by carrying out the process of the invention using the type of apparatus illustrated in FIGURE 1 it is possible to maintain adequate agitation and aeration in the fermentation liquor without deposition of mycelium on the walls or in the free spaces of the fermentor. This is accomplished by the shearing action of the agitation blades which supplements the normal agitation provided by rotation of these blades. Hence the mechanical difficulties encountered in carrying out continuous fermentation processes in standard fermentation tanks are obviated by the process of the present invention. Further the difficulties mentioned previously which arise from accumulation of material deposited in the free spaces in tank fermentors do not occur when using the process of the invention.

The term "shearing force" is employed throughout this specification and claims to designate the type of force applied to the fermentation liquor by the rotation of the blades 7 in the above-described fermentor. This type of agitation produced in this manner is novel and is distinguished from that which is normally employed in conventional fermentors. Thus in a conventional tank fermentor the agitation is provided by the rotation of a paddle type stirrer. The operation of such a stirrer produces a high degree of agitation at very localized points in the fermentation liquor and at such points the oxygen uptake by the liquor is greatly facilitated. However, in the bulk of the fermentation the agitation is of a low order insufficient to produce efficient oxygen uptake. In contrast the method of agitation in the elongated cylindrical fermentor described above produces a high degree of agitation through substantially the whole of the fermentation liquor. Each of the multiplicity of blades imparts a shearing force to the liquid through which it is passing. Further, each blade is constantly leaving and re-entering the surface of the fermentation liquor (this is in sharp contrast to conventional stirrers which are completely submerged in the liquid). Hence the surface of the liquor is constantly shattered by the re-entry of a blade. The shearing action of the blade in the liquid plus the constant shattering of the liquid surface greatly facilitates the uptake of oxygen by the liquid by breaking down both the liquid and the air into fine particles. Hence the operation of the rotating blades provides a high degree of agitation and a high rate of oxygen transfer at a multiplicity of points throughout the fermentation liquor in contrast to the localized agitation produced by conventional stirrers.

It is to be noted that, while the novel means of agitation described above has been described with respect to its use in an elongated cylindrical fermentor with its longitudinal axis mounted horizontally, said novel means can also be applied to the agitation of liquids in conventional vessels and, in particular, to the agitation of fermentation liquors. For this purpose the multiplicity of blades is mounted on one or a plurality of shafts mounted substantially vertically in conventional fermentor tanks. The blades are so arranged that by rotation thereof substantially the whole of the liquid in the tank is subjected to agitation. By such means it is possible to produce agitation and oxygen transfer which is superior to that produced by conventional type stirrers in said tanks. In an alternative arrangement a combination of conventional type stirrer and a multiplicity of rotating blades mounted on a substantially vertical shaft can be employed in the agitation of liquor in tank fermentors.

Figure 3:
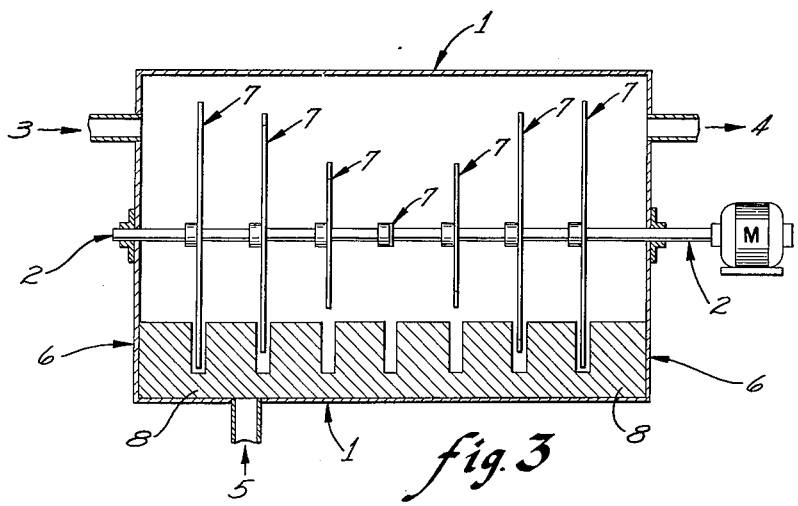
FIGURE 3 shows a cross-sectional view taken in a plane vertical to the longitudinal axis of a single-compartment of the fermentor, fitted with a baffle plate, in which the process of the invention can be carried out.

In a preferred modification of the type of apparatus shown in FIGURE 1, the agitation and aeration of the fermentation liquid is improved still further by mounting one or more baffle plates longitudinally on the inner wall of the vessel 1 so that said baffles are below the surface of the fermentation liquor. The baffle or baffles preferably take the form of strips of non-corrosive material such as stainless steel which project from the side of the vessel towards the central axis. The width of each strip is greater than the clearance between the tip of the rotating blades 7 and the side of the cylinder 1 and is preferably of the order of slightly less than one-half the radius of the cylinder 1. Each strip is provided with slots through which the rotating blades 7 can pass, the clearance between the surface of the blades and the sides of the slots being as small as possible so that the passage of the blades through the slots imparts a shearing action to the fermentation liquor. These baffles also tend to keep the blades free of growth. The shape and manner of mounting these baffles is illustrated by FIGURE 3 which shows a typical baffle 8 in position in a fermentation vessel of the type shown in FIGURE 1.

In a further modification of the process of the invention an apparatus such as that illustrated in FIGURE 4 is employed. This type of apparatus is essentially a number of fermentors, of the type illustrated in FIGURE 1, arranged in series, the contents of each member of the series being separated from its neighbours by means of plates having openings in the upper part of their walls. Thus in FIGURE 4 the fermentor comprises a cylinder 1 mounted substantially horizontally and provided with end plates. The cylinder is divided into a plurality of compartments by means of plates 9 mounted in a plane at right angles to the longitudinal axis of the cylinder. Each of the plates 9 has a hole 10 in its upper surface which allows gravitational overflow to the neighboring compartment. Each of the plates 9 and the end plates 6 is adapted to support an axle 2 on which are mounted the agitator blades 7 in the same manner as in the apparatus of FIGURE 1. The axle 2 can be rotated by means of a motor M mounted at one end thereof. One of the end plates 6 is provided with an inlet 3 and the other end plate 6 is provided with an outlet 4. Each of the compartments in the cylinder is provided with inlet means 5 for the introduction of air and the inlets 3 and 5 and the outlet 4 are provided with valves, metering devices, etc. (not shown). The cylinder 1 can also be provided with one or more horizontal baffles of the type 8 as shown in FIGURE 3.

The process of the invention is carried out in a multicompartment apparatus such as that illustrated in FIGURE 4 using essentially the same technique as that described above for the single compartment apparatus typified in FIGURE 1, the fresh nutrient medium being introduced at 3 and fermentation liquor being allowed to flow from 4. The use of apparatus such as that illustrated in FIGURE 4 is of particular advantage when the fermentation is being carried out for biosynthetic purposes, for example in the production of an antibiotic, citric acid, etc. Illustratively when an antibiotic-producing microorganism is propagated in an apparatus such as that of FIGURE 4 it is found that there is heterogeneity of conditions between the various compartments. Thus in the case of an antibiotic-producing microorganism it is found that there is a progressive increase in titre on passing from the first compartment (i.e., the compartment to which fresh nutrient medium is introduced) through successive compartments. Whilst the fermentation in each compartment is maintained in a substantially steady state there is a gradient in titre from one end to the other of the fermentation cylinder.

The multicompartment fermentor can also be provided, if desired, with inlets 11 in the upper half of each of the compartments so that the fermentation conditions in one or more compartments can be varied, for example, by addition of fresh nutrient medium, precursors, antifoam and the like or by changing the temperature therein.

Using the processes of the invention as described above it has been found that continuous fermentations can be carried out in which the fermentation liquor has an apparent viscosity as high as 1000 centipoises. Normally the apparent viscosity of a fermentation liquor in a batch type fermentation has a pronounced effect on oxygen transfer, reducing it markedly (by as much as 80%) over the range of apparent viscosity of 1 centipoise to 100 centipoises. This reduction of oxygen transfer presents a major problem in the propagation of filamentous microorganisms in batch type or in so-called continuous fermentations in conventional apparatus. The problem is largely overcome in the process of the present invention by the novel and highly efficient mode of agitation and aeration. Thus the process of the invention can be employed successfully even in fermentations wherein the fermentation liquor develops an apparent viscosity of from about 25 to about 1000 centipoises. Such fermentations present considerable difficulties in regard to aeration and agitation when carried out in conventional apparatus.

It is to be noted that, in place of the addition of fresh nutrient medium to the fermentor in the processes described above, addition can be made on a continuous or semicontinuous basis, of an actively growing population of the microorganism which is being propagated in the main fermentor.

Whilst the process of the invention is illustrated in the following examples by its application to the propagation of microorganisms which produce antibiotics or enzyme systems suitable for the oxygenation of steroids, it is to be understood that the process is not limited to such applications and can be used in the propagation of a wide variety of microorganisms such as those set forth above. Further, where the process of the invention is employed in the propagation of microorganisms which produce enzyme systems capable of the oxidation or other modification of steroids and like materials, a number of alternate ways of utilizing the process of the invention are available. Thus the propagation of the microorganisms can be carried out in a one-section cylindrical fermentor such as that shown in FIGURE 1 and the steroid, or other material to be modified, can be added to this fermentor. Alternatively, the microorganism can be propagated in any of the types of cylindrical fermentor discussed above and the fermentation liquor can be transferred to another vessel before addition of the steroid or other material. As a further alternative, the microorganism can be propagated in a multi-compartment cylindrical fermentor such as that shown in FIGURE 4, the major growth of the microorganism taking place in the first compartment or compartments of the fermentor and the steroid or other material being introduced in one or more of the later compartments of the fermentor through inlets 11 in the upper half of the later compartments of the fermentor.

Where the process of the invention is employed in the propagation of antibiotic-producing microorganisms the effluent from the fermentor can be processed on a continuous or semi-continuous basis, using conventional procedures such as filtration, solvent extraction, adsorption, and the like, to recover the antibiotic.

The following examples are illustrative of the process of the present invention but are not to be construed as limiting.

EXAMPLE 1

A fermentation in which novobiocin was produced by continuous propagation of *Streptomyces niveus* NRRL 2466 was carried out using the following procedure.

The fermentor consisted of a horizontal stainless steel cylinder 18 feet in length and 8 inches in diameter comprised of 9 flanged sections, each 2 feet long. The fermentor was sealed at each end by end plates and between each flange was mounted a stainless steel plate having a replaceable bearing at its center and a circular hole one inch in diameter located one inch from its uppermost edge. Each compartment was provided with a stainless steel baffle plate 3/8" in thickness and 3.5 inches high mounted along the length of the section at its lowest point. The plates were provided with serrations through which the blades could pass when rotated. Two independently driven shafts, each 9 feet in length, were mounted end to end along the longitudinal axis of the cylinder. The shafts were supported by the bearings in each of the flange plates and were provided with sterilizable mechanical seals at the point at which they emerged from the end plates. A total of 30 blades of 26 gauge stainless steel, each blade being 6 inches in length, were mounted at regular intervals along the shafts in each of the compartments. Each compartment of the fermentor was provided with a sight glass, a light glass, two cooling jackets supplied with cooling water controlled by manually operated valves, air inlets fitted with rotameters on the bottom of the sections, and inlets for antifoam additions. One end plate of the fermentor was provided in its upper surface with an inlet valve through which sterilized nutrient medium could be supplied from a feed tank. The other end plate was provided with an outlet valve through which fermentation liquor could be removed and passed to a collection vessel.

The total internal volume of the fermentor tube was approximately 180 liters and the internal volume of each individual section was approximately 20 liters.

The equipment was steam sterilized under pressure and charged with approximately 135 liters of sterilized nutrient medium having the following composition:

40 g. glucose monohydrate
40 g. distillers' solubles

Sufficient tap water to make 1 liter.

The shafts and blades were rotated at a speed of 600 r.p.m. and there was then pumped into the fermentor 30 liters of vegetative inoculum, prepared by growing a single spore, taken from a stock culture of *Streptomyces niveus*, in an agar plug, transferring the mycelium to a shake flask and using the resulting vegetative growth to inoculate agar slants from which shake flasks and then seed tanks were propagated. Fresh sterile nutrient medium, having the composition described above, was then fed into the fermentor through the inlet in the end plate at a rate of 8 ml. per minute. Fermentation liquor was withdrawn through the outlet in the end plate at the other end of the fermentor at the rate of 8 ml. per minute. Sterile air was introduced into each compartment of the fermentor under a pressure of 20 p.s.i. and at a rate of 10 liters per minute. The temperature of the fermentation liquor was maintained at 30° C. The effluent liquor showed an antibiotic titre (ultraviolet assay) of 200 mcg./g. of beer at 2 days which titre gradually increased to a value of 476 mcg./g. after 12 days. The titre remained substantially constant at this level until the twenty-fifth day when the titre began to fall and the fermentation was discontinued.

EXAMPLE 2

A fermentation in which neomycin was produced by continuous propagation of *Streptomyces fradiae* WC 3535 was carried out using the following procedure.

The fermentor described in Example 1 was sterilized and charged with approximately 135 liters of sterilized nutrient medium having the following composition:

| | |
|---|---|
| Glucose monohydrate | g-- 25 |
| Starch | g-- 15 |
| Soybean meal | g-- 50 |
| Dry yeast (Pabst) | g-- 5 |
| Lard oil | ml-- 4 |
| Sodium chloride | g-- 5 |
| Calcium carbonate | g-- 2 |

Water to make 1 liter.

Rotation of the agitator shaft at a speed of 600 r.p.m. was commenced and 30 liters of a vegetative inoculum, prepared from a stock culture of *Streptomyces fradiae* using agar slants, shake flasks and finally seed tanks, was pumped into the fermentor. Addition of fresh sterile culture medium, having the above composition, at a rate of 15 ml. per minute, and withdrawal of fermentation liquor at the same rate, was instituted. Sterile air was introduced into each compartment of the fermentor tube at a pressure of 20 p.s.i. and a rate of 10 liters per minute. The temperature of each section of the fermentor was maintained at 30° C. The titre of the effluent liquor was 1440 mcg./ml. Neomycin B. (*B. subtilis* assay) on the third day and remained at approximately this level until the twelfth day when the titre began to fall slowly. On the fourteenth day the titre of the effluent liquor was 1000 mcg./ml. and was 600 mcg./ml. on the sixteenth day. The fermentation was discontinued after 26 days at which time the titre of the effluent liquor was less than 50 mcg./ml.

EXAMPLE 3

A fermentation in which streptozotocin was produced by continuous propagation of *Streptomyces achromogenes* var. 128 NRRL 2697 was carried out using the following procedure.

The fermentor described in Example 1 was sterilized and charged with approximately 135 liters of sterilized nutrient medium having the following composition:

| | |
|---|---|
| Corn meal | g-- 40 |
| Starch | g-- 18 |
| Casein pancreatic digest [N-Z-Amine Type B; Sheffield Chemical] | g-- 6 |
| Ammonium sulfate | g-- 3 |
| Zinc sulfate heptahydrate | mg-- 5 |

Water to make 1 liter.

The agitator shaft rotated at 600 r.p.m. and 30 liters of a vegetative inoculum, prepared from a stock culture of *Streptomyces achromogenes* var. 128 using agar slants, shake flasks and finally seed tanks, was pumped into the fermentor. Addition of fresh sterile culture medium, having the above composition, at a rate of 8.8 ml. per minute and withdrawal of fermentation liquor at the same rate was instituted. Sterile air was introduced into each compartment of the fermentor tube at a pressure of 20 p.s.i. and a rate of 10 liters per minute. The temperature of each compartment of the tube was maintained at 30° C. The antibiotic titre of the effluent liquor reached a level of 370 mcg./ml. (*P. vulgaris* bioassay) after 7 days and remained at substantially this level until the thirtieth day. After the thirtieth day the titre of the effluent liquor began to fall slowly until it reached a value of 40 mcg./ml. on the forty-second day at which stage the fermentation was discontinued.

EXAMPLE 4

The continuous propagation of the organism *Rhizopus nigricans* was accomplished using the following procedure.

The apparatus described in Example 1 was shortened to leave only 2 compartments and these compartments were made fully intercommunicating by replacing the separating plate between them by a "spider" plate serving as shaft support. The agitator blades were replaced by similar blades having double the thickness. The apparatus was steam sterilized under pressure and charged with approximately 30 liters of nutrient medium having the following composition:

| | |
|---|---|
| Glucose monohydrate | g 10 |
| Corn steep liquor | g 20 |
| Novobiocin | mg 50 |
| Neomycin | mg 50 |

Water to make 1 liter.

The shaft was rotated at a speed of 600 r.p.m. and 6 liters of inoculum, prepared from a stock culture of *Rhizopus nigricans* using agar slants, shake flasks and finally seed tanks, was pumped into the fermentor. Addition of fresh sterile medium, having the above composition, at a rate of 2 liters per hour at the beginning of the first compartment, and withdrawal of fermentation liquor at the same rate at the end of the second compartment, was instituted. Sterile air was introduced into each compartment of the fermentor under a pressure of 20 p.s.i. and at a rate of 10 liters per minute. The withdrawn fermentation liquor was fed to a series of vessels for use in the oxygenation of progesterone to 11α-hydroxyprogesterone. The continuous propagation of the organism was continued for a period of 7 days in the above manner before the fermentation was discontinued.

EXAMPLE 5

The continuous propagation of the organism *Rhizopus nigricans* and the oxidation of progesterone to 11α-hydroxyprogesterone using the resulting fermentation liquor was carried out in the following manner.

The apparatus described in Example 1 was modified by replacement of the separating plate between compartments 1 and 2 by a spider plate so that these compartments formed one single compartment. The fermentor was steam sterilized under pressure. Sterile nutrient medium having the composition described in Example 4 was pumped into the fermentor. The shaft was rotated at a speed of 600 r.p.m. and 30 liters of inoculum, prepared from a stock culture of *Rhizopus nigricans* using agar slants, shake flasks and finally seed tanks, was pumped into the fermentor. Addition of fresh sterile medium, having the above composition, at a rate of 2 liters per hour, at the beginning of the first section and withdrawal of fermentation liquor, at the same rate, at the end of the second compartment, was instituted. Sterile air was supplied to each compartment of the fermentor under a pressure of 20 p.s.i. and at a rate of 10 liters per minute. After the fermentation had been in progress for 2 days addition to the third section of a 10% solution of progesterone in acetone at a rate of 20 ml. per hour was commenced. Thereafter the effluent liquor was collected and extracted batchwise with equal parts of methylene chloride. The methylene chloride extracts were dried and the dried solution was evaporated to dryness to recover 11α-hydroxyprogesterone. The fermentation was discontinued after the nineteenth day. A total of 60% of the progesterone added in section 3 was recovered from the effluent as 11α-hydroxyprogesterone.

We claim:

1. A process for the continuous propagation of filamentous microorganisms which comprises propagating said microorganisms under aerobic conditions in an elongated cylindrical fermentor with its longitudinal axis substantially in a horizontal plane, agitating the fermentation liquor by subjecting same to a shearing force at a plurality of positions in the fermentor said shearing force being applied in a plane substantially perpendicular to the longitudinal axis of said fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

2. A process for the continuous propagation of filamentous microorganisms which comprises propagating said microorganisms under aerobic conditions in an elongated cylindrical fermentor mounted with its longitudinal axis substantially in a horizontal plane, the contents of said fermentor being agitated by the rotation of a plurality of blades mounted at right angles to the longitudinal axis of the fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

3. A process for the continuous propagation of filamentous microorganisms which comprises propagating said microorganisms under aerobic conditions in an elongated cylindrical fermentor mounted with its longitudinal axis substantially in a horizontal plane, said fermentor being divided into a plurality of interconnecting compartments, agitating the fermentation liquor by applying shearing forces in a plane substantially perpendicular to the longitudinal axis of said fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

4. A process for the continuous propagation of filamentous microorganisms which comprises propagating said microorganisms under aerobic conditions in an elongated cylindrical fermentor mounted with its longitudinal axis substantially in a horizontal plane, the contents of said fermentor being agitated by the rotation of a plurality of blades mounted at right angles to the longitudinal axis of the fermentor, said blades passing through corresponding slots in at least one baffle plate mounted lengthwise on the inner surface of the lower part of said fermentor, said baffle plate projecting inwardly from the wall of said fermentor a distance greater than the clearance between the tips of said blades and the walls of said fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

5. A process for the continuous propagation of filamentous microorganisms which comprises propagating said microorganisms under aerobic conditions in an elongated cylindrical fermentor mounted with its longitudinal axis substantially in a horizontal plane, said fermentor being divided into a plurality of interconnecting compartments, the contents of each of said compartments being agitated by the rotation of a plurality of blades mounted at right angles to the longitudinal axis of the fermentor, said blades passing through corresponding slots in baffle plates mounted lengthwise on the inner surface of the lower part of the compartments of said fermentor, said baffle plates projecting inwardly from the wall of said fermentor a distance greater than the clearance between the tips of said blades and the walls of said fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

6. A process for the continuous production of an antibiotic which comprises propagating an antibiotic-producing filamentous microorganism under aerobic conditions in an elongated cylindrical fermentor mounted with its longitudinal axis substantially in a horizontal plane, the contents of said fermentor being agitated by the rotation of a plurality of blades mounted at right angles to the longitudinal axis of the fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state and recovering the antibiotic activity from the withdrawn fermentation liquor.

7. A process for the continuous production of an antibiotic which comprises propagating an antibiotic-producing filamentous microorganism under aerobic conditions in an elongated cylindrical fermentor mounted with its longitudinal axis substantially in a horizontal plane, said fermentor being divided into a plurality of interconnecting compartments, the contents of said compartments being agitated by the rotation of a plurality of blades mounted at right angles to the longitudinal axis of the fermentor continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state, and recovering the antibiotic activity from the withdrawn fermentation liquor.

8. A process for the continuous production of an antibiotic which comprises propagating an antibiotic-producing filamentous microorganism under aerobic conditions in an elongated cylindrical fermentor mounted with its longitudinal axis substantially in a horizontal plane, said fermentor being divided into a plurality of interconnecting compartments, the contents of each of said compartments being agitated by the rotation of a plurality of blades mounted at right angles to the longitudinal axis of the fermentor, said blades passing through corresponding slots in baffle plates mounted lengthwise on the inner surface of the lower part of the compartments of said fermentor, said baffle plates projecting inwardly from the wall of said fermentor a distance greater than the clearance between the tips of said blades and the walls of said fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state, recovering the antibiotic activity from the withdrawn fermentation liquor.

9. A process for the production of a filamentous oxidative-enzyme-producing microorganism which comprises propagating said microorganism under aerobic conditions in an elongated cylindrical fermentor mounted with its longitudinal axis substantially in a horizontal plane, the contents of said fermentor being agitated by the rotation of a plurality of blades mounted at right angels to the longitudinal axis of the fermentor continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

10. A process for the production of a filamentous oxidative-enzyme-producing microorganism which comprises propagating said microorganism under aerobic conditions in an elongated cylindrical fermentor mounted with its longitudinal axis substantially in a horizontal plane, said fermentor being divided into a plurality of interconnecting compartments, the contents of said compartments being agitated by the rotation of a plurality of blades mounted at right angles to the longitudinal axis of the fermentor, continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state.

11. A process for the microbiological oxidation of a steriod which comprises propagating a filamentous oxidative-enzyme-producing microorganism under aerobic conditions in an elongated cylindrical fermentor mounted with its longitudinal axis substantially in a horizontal plane, the contents of said fermentor being agitated by the rotation of a plurality of blades mounted at right angles to the longitudinal axis of the fermentor continuously introducing nutrient medium at one end of said fermentor and allowing fermentation liquor to flow from the opposite end of said fermentor so that the total volume of liquid in said fermentor remains constant, the rate of addition of nutrient medium being adjusted so that the rate of multiplication of the microorganisms is maintained in a steady state, adding a steroid to the withdrawn fermentation liquor and recovering oxidized steroid from the mixture.

12. A process for the microbiological oxidation of a steroid which comprises propagating a filamentous oxidative-enzyme-producing microorganism under aerobic conditions in an elongated cylindrical fermentor mounted with its longitudinal axis substantially in a horizontal plane, said fermentor being divided into a plurality of interconnecting compartments, the contents of said compartments being agitated by the rotation of a plurality of blades mounted at right angles to the longitudinal axis of the fermentor, continuously introducing nutrient medium at one end of said fermentor and allowing fermentation liquor to flow from the opposite end of said fermentor so that the total volume of liquid in said fermentor remains constant, the rates of addition of nutrient medium being adjusted so that the rate of multiplication of the microorganism is maintained in a steady state, adding a steroid to the withdrawn fermentation liquor and recovering oxidized steroid from the mixture.

13. A process for the microbiological oxidation of a steroid which comprises propagating a filamentous oxidative-enzyme-producing microorganism under aerobic conditions in an elongated cylindrical fermentor mounted with its longitudinal axis substantially in a horizontal plane, said fermentor being divided into a plurality of interconnecting compartments, the contents of said compartments being agitated by the rotation of a plurality of blades mounted at right angles to the longitudinal axis of the fermentor, continuously introducing nutrient medium at one end of said fermentor and allowing fermentation liquor to flow from the opposite end of said fermentor so that the total volume of liquid in said fermentor remains constant, the rates of addition of nutrient medium being adjusted so that the rate of multiplication of the microorganisms is maintained in a steady state, introducing a steroid into one of the compartments of the fermentor other than that to which addition of fresh nutrient is made, and recovering oxygenated steroid from the withdrawn fermentation liquor.

References Cited in the file of this patent
UNITED STATES PATENTS

| | | |
|---|---|---|
| 1,750,267 | Harrison | Mar. 11, 1930 |
| 2,793,166 | Hatch | May 21, 1957 |